United States Patent
Dickson

(10) Patent No.: US 11,091,270 B2
(45) Date of Patent: Aug. 17, 2021

(54) BUOYANCY DRIVEN PASSIVE VEHICLE AIR DRYING SYSTEM AND METHOD

(71) Applicant: The Boeing Company, Chicago, IL (US)

(72) Inventor: Jennifer Lynn Dickson, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 97 days.

(21) Appl. No.: 16/253,732

(22) Filed: Jan. 22, 2019

(65) Prior Publication Data
US 2020/0231290 A1    Jul. 23, 2020

(51) Int. Cl.
| | | |
|---|---|---|
| B64D 13/00 | (2006.01) | |
| B64D 13/08 | (2006.01) | |
| F24F 13/22 | (2006.01) | |
| B01D 53/26 | (2006.01) | |

(52) U.S. Cl.
CPC ........... *B64D 13/08* (2013.01); *B01D 53/265* (2013.01)

(58) Field of Classification Search
CPC ...... B01D 53/265; B64D 13/00; B64D 13/02; B64D 13/06; B64D 13/08; B64D 2013/0603; B64D 2013/0622; B64D 2013/0633; B64D 2013/064; B64C 1/066; B64C 1/067; B64C 1/068; B64C 1/10; F24F 13/22; F24F 13/222; F24F 2003/144
See application file for complete search history.

(56) References Cited

U.S. PATENT DOCUMENTS

| | | |
|---|---|---|
| 3,867,244 A | 2/1975 | Adams |
| 5,386,952 A | 2/1995 | Nordström et al. |
| 5,897,079 A | 4/1999 | Specht et al. |
| 6,491,254 B1 | 12/2002 | Walkinshaw et al. |
| 7,005,175 B2 | 2/2006 | Hachenberg et al. |
| 7,946,525 B2 | 5/2011 | Gröning |
| 8,157,209 B2 | 4/2012 | Dittmar et al. |

(Continued)

FOREIGN PATENT DOCUMENTS

| | | |
|---|---|---|
| CA | 2348501 A1 | 5/2000 |
| DE | 19849696 A1 | 5/2000 |

(Continued)

OTHER PUBLICATIONS

ECHO Air Inc, "About ECHO Air Inc", retrieved from the internet: http://www.indoorair.ca/echo/index.php [retrieved on Oct. 4, 2018]; pp. 1-4.

(Continued)

*Primary Examiner* — Frantz F Jules
*Assistant Examiner* — Erik Mendoza-Wilkenfel
(74) *Attorney, Agent, or Firm* — Coats & Bennett, PLLC

(57) ABSTRACT

Ventilation systems and methods for controlling moisture in a vehicle. The ventilation systems include one or more inlet ducts and outlet ducts that extend through an inner wall and into a gap formed at an outer wall. The ventilation systems provide for passive air flow with air moving into the one or more inlet ducts and into the gap. The air is cooled against the outer wall and vertically drops along the gap. Moisture in the air freezes against the outer wall while the air is in the gap. The less humid air then moves through the one or more outlet ducts and back into the interior space.

20 Claims, 6 Drawing Sheets

(56) References Cited

U.S. PATENT DOCUMENTS

| | | | |
|---|---|---|---|
| 8,245,974 B2* | 8/2012 | Paul | B64C 1/067 244/129.1 |
| 8,262,023 B2 | 9/2012 | Köfinger et al. | |
| 8,308,103 B2 | 11/2012 | Boock et al. | |
| 8,327,976 B2 | 12/2012 | Müller et al. | |
| 10,308,364 B2 | 6/2019 | Markwart et al. | |
| 2003/0087049 A1* | 5/2003 | Hachenberg | B64C 1/067 428/34.1 |
| 2004/0256520 A1 | 12/2004 | Guard et al. | |
| 2005/0236523 A1 | 10/2005 | Schwartz et al. | |
| 2009/0189018 A1* | 7/2009 | Dittmar | B64C 1/066 244/121 |
| 2012/0040599 A1* | 2/2012 | Hesselbach | B64D 11/00 454/143 |
| 2013/0009010 A1 | 1/2013 | Auriac et al. | |
| 2015/0266584 A1 | 9/2015 | Koerner et al. | |

FOREIGN PATENT DOCUMENTS

| | | |
|---|---|---|
| DE | 10154063 A1 | 5/2003 |
| DE | 102006023209 A1 | 11/2007 |
| DE | 102007008987 A1 | 8/2008 |
| DE | 102007049926 A1 | 4/2009 |
| DE | 102008025389 A1 | 7/2009 |
| DE | 102008037143 A1 | 2/2010 |
| DE | 102006039292 B4 | 7/2010 |
| WO | 0037313 A1 | 6/2000 |
| WO | 2005095206 A1 | 10/2005 |
| WO | 2006114332 A2 | 11/2006 |
| WO | 2008101986 A1 | 8/2008 |

OTHER PUBLICATIONS

European Search Report dated May 25, 2020 in re EP Application No. 19212723.1.

\* cited by examiner

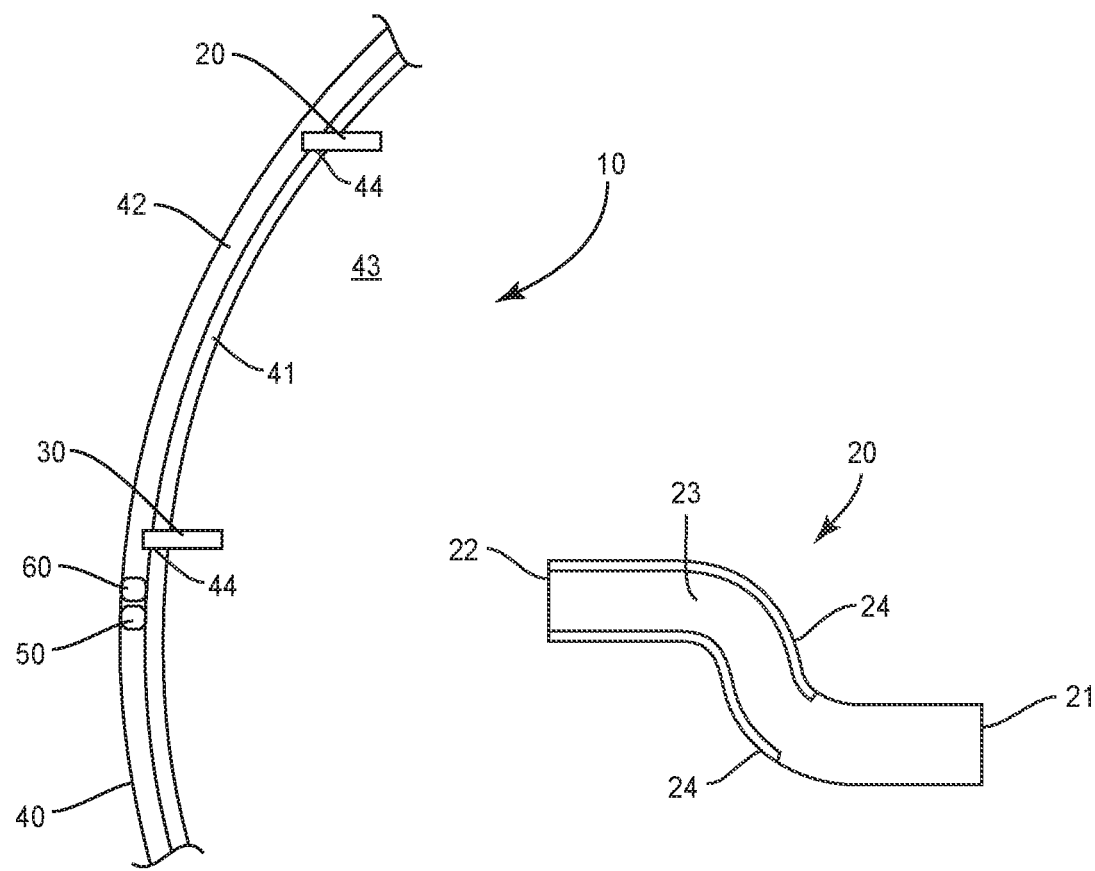
FIG. 3
FIG. 5
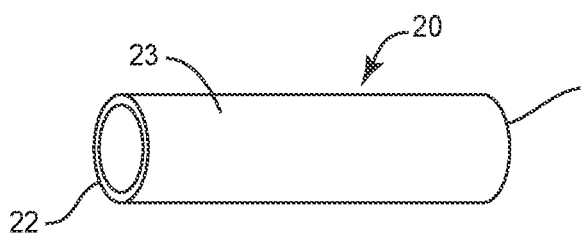
FIG. 4
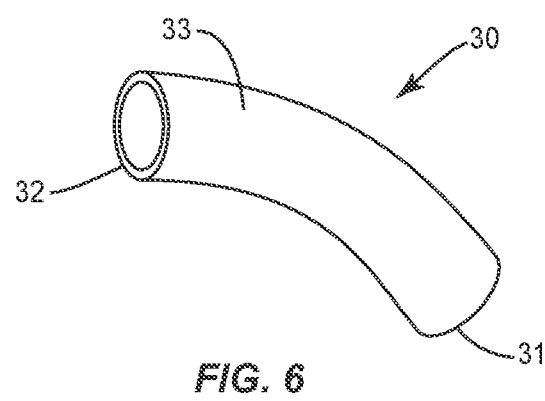
FIG. 6

BUOYANCY DRIVEN PASSIVE VEHICLE AIR DRYING SYSTEM AND METHOD

TECHNOLOGICAL FIELD

The present disclosure generally relates to moisture control. More particularly, the present disclosure relates to devices and methods for passively controlling moisture within a vehicle.

BACKGROUND

The outer wall of an aircraft experiences temperature variations during a flight. The outer wall can be relatively warm while the aircraft is on the ground or at low altitude, and relatively cold at higher altitudes. An insulation layer is positioned along the outer wall to address the temperature changes and maintain a more constant temperature within the cabin of the aircraft. The insulation layer is typically formed from a waterproof material. During a flight when the aircraft is at a high altitude, liquid from moist air in the cabin can condense against the cold outer wall and freeze. During decent, this frozen liquid can thaw and drip back down towards the cabin.

Because the insulation layer is waterproof, the liquid can flow along the insulation layer and drain into the bilge. However, at some locations, structures and/or supports can protrude through the insulation layer. For example, support members that hold monuments and bins extend through the insulation layer and into the cabin. The insulation layer can come with predefined holes for the support members to extend through the insulation layer. When the liquid thaws, it can drip down through the holes and into the cabin.

SUMMARY

One aspect is directed to a system to passively remove moisture from air within a vehicle. The vehicle includes an outer wall, an insulation layer that extends along the outer wall, a gap formed between the outer wall and the insulation layer, and a cabin area formed within the insulation layer at a center of the vehicle. The system includes a first duct that extends through an insulation layer. The first duct includes an inlet positioned in a cabin area of the vehicle and an outlet positioned in a gap formed between an outer wall and the insulation layer. A second duct extends through the insulation layer. The second duct includes an inlet positioned in the gap and an outlet positioned in the cabin area. The second duct is positioned in the vehicle vertically below the first duct. The inlet and the outlet of each of the first and second ducts are open and unattached to an air moving device. The first and second ducts are positioned for enabling air within the vehicle to passively move through the first duct and into the gap, move downward through the gap where moisture in the air freezes against the outer wall, and move out of the second duct and back into cabin area.

In another aspect, the first duct has a smaller minimum cross-sectional area than the second duct.

In another aspect, the system includes a seal positioned along the gap vertically below the second duct with the seal configured to prevent air from flowing along the gap vertically below the second duct.

One aspect is directed to a vehicle. The vehicle includes an outer wall that experiences a decrease in temperature in response to an increase in altitude of the vehicle. An insulation layer is positioned along the outer wall. The insulation layer includes an outer side that faces towards the outer wall and an inner side. A gap is positioned between outer wall and the insulation layer. The gap extends from a crown of the vehicle downward along a sidewall of the vehicle. A seal is positioned at the gap to prevent airflow. A first duct extends through the insulation layer and includes an inlet positioned on the inner side of the insulation layer and an outlet positioned in the gap. A second duct extends through the insulation layer and includes an inlet positioned in the gap and an outlet positioned on the inner side of the insulation layer. Each of the inlet of the first duct and the outlet of the second duct is open and exposed on the inner side of the insulation layer. The second duct is positioned vertically below the first duct and positioned vertically above the seal. The outer wall, when experiencing a decrease in temperature below the freezing temperature of water, cause moisture in the air within the gap to freeze against the outer wall when the air in the gap moves from the first duct to the second duct.

In another aspect, the outer wall is an exterior wall of the vehicle.

In another aspect, the first duct includes a smaller cross-sectional area than the second duct.

In another aspect, a drain is positioned vertically below the second duct with the drain configured to receive moisture that accumulates within the gap.

In another aspect, the inlet of the second duct faces vertically downward within the gap to prevent moisture within the gap from being captured in the second duct.

In another aspect, the first duct is positioned in proximity to a crown of the vehicle and the second duct is positioned along a sidewall of the vehicle.

Another aspect is directed to a method of passively ventilating air within a vehicle. The method includes passively moving air from a cabin area into one or more first ducts that extends through an insulation layer and into a gap formed between the insulation layer and an outer wall of the vehicle. The method includes cooling the air within the gap that flows against the outer wall where the outer wall is at a temperature below the freezing temperature of water and causes cooling of air flowing along the wall and moving the air vertically downward within the gap towards the second duct. The method includes freezing moisture in the air in the gap that comes into contact with the outer wall. The method includes passively moving the air through one or more second ducts and back into the cabin area. The method includes preventing the air from moving along the gap vertically below the one or more second ducts.

In another aspect, the method includes creating a difference in air pressure within the gap between outlets of the one or more first ducts and inlets of the one or more second ducts.

In another aspect, the method includes exposing the inlets of the one or more first ducts and the outlets of the one or more second ducts in the cabin area.

In another aspect, the method includes capturing moisture in the gap below the one or more second ducts and moving the moisture out of the gap.

In another aspect, the method includes sealing the gap below the one or more second ducts and preventing air in the gap from moving downward in the gap beyond the one or more second ducts.

In another aspect, the method includes positioning the one or more first ducts through the insulation layer with inlets of the one or more first ducts in the cabin area and outlets of the one or more first ducts within the gap formed between the insulation layer and the outer wall.

In another aspect, the method includes positioning the one or more second ducts through the insulation layer vertically below the one or more first ducts and positioning inlets of the one or more second ducts within the gap and an outlet of the one or more second ducts in the cabin area.

In another aspect, the method includes positioning the one or more first ducts at a crown of the vehicle and positioning the one or more second ducts along a sidewall of the vehicle and above a floor of the cabin area.

In another aspect, the method includes decreasing a temperature of the air within the gap and increasing a density of the air as the air moves from the one or more first ducts towards the one or more second ducts.

In another aspect, the method includes increasing the temperature of the air within the cabin area after it exits from the one or more second ducts and decreasing a density of the air as the air moves from the one or more second ducts towards a crown of the vehicle.

In another aspect, the method includes extending bodies of the one or more first and second ducts through the insulation layer.

BRIEF DESCRIPTION OF THE DRAWINGS

FIG. 3 is a side schematic view of a ventilation system with a drain and a seal.
FIG. 4 is a schematic perspective view of an inlet duct.
FIG. 5 is a schematic perspective view of an inlet duct.
FIG. 6 is a schematic perspective view of an outlet duct.

DETAILED DESCRIPTION

The present application is directed to ventilation systems for controlling moisture in a vehicle. The ventilation systems include one or more inlet ducts that extend through an inner wall. An inlet end is positioned within an interior space of the vehicle, and an outlet end is positioned in a gap formed at an outer wall. The outer wall is cooled by the outside air during operation of the vehicle at high altitude flight and experiences a decrease in temperature below the freezing temperature of water responsive to an increase in altitude of the vehicle (e.g., an altitude above 10,000 feet). The ventilation system also includes one or more outlet ducts that extend through the inner wall and are positioned vertically below the one or more inlet ducts. The outlet ducts include an inlet end in the gap and an outlet end in the interior space of the vehicle. The ventilation systems provide for passive air flow with air moving into the one or more inlet ducts and into the gap. The air in the gap may move along and/or flow against the outer wall where the air is cooled and vertically drop along the gap. Moisture in the air within the gap freezes against the outer wall while the air moves in the gap to control the humidity of the air. The air in the gap then moves through the one or more outlet ducts and back into the interior space.

Figure 1:
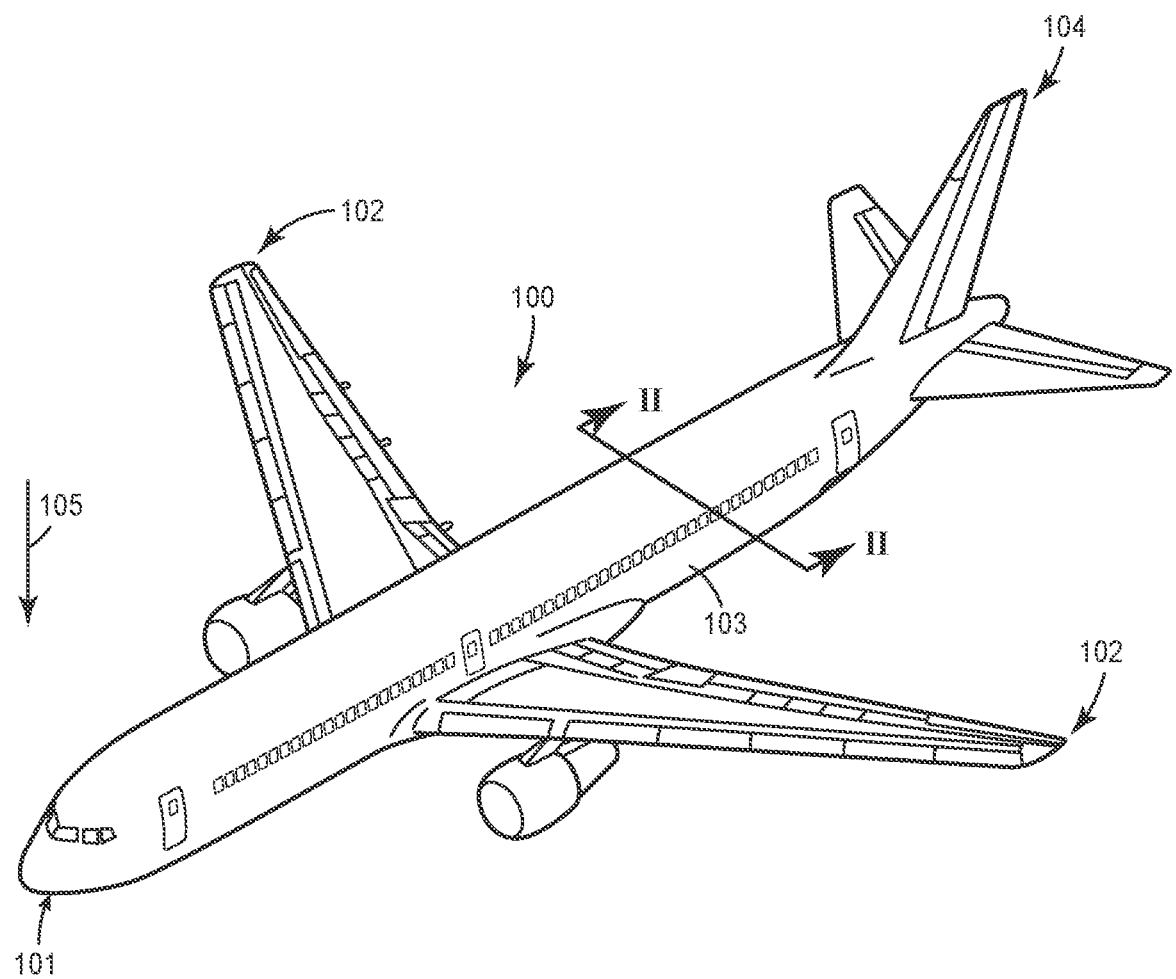
FIG. 1 is a perspective view of a vehicle.

The ventilation systems and methods to control moisture apply to a variety of different vehicles. FIG. 1 illustrates one type of vehicle 100, namely an aircraft 100. The aircraft 100 includes a nose 101, wings 102, a fuselage 103, and a tail 104. FIG. 1 also illustrates a downward arrow 105 indicating the expected direction in which the force of gravity will pull objects, such as moisture, onboard an aircraft 100 in a nominal operational profile.

Figure 2:
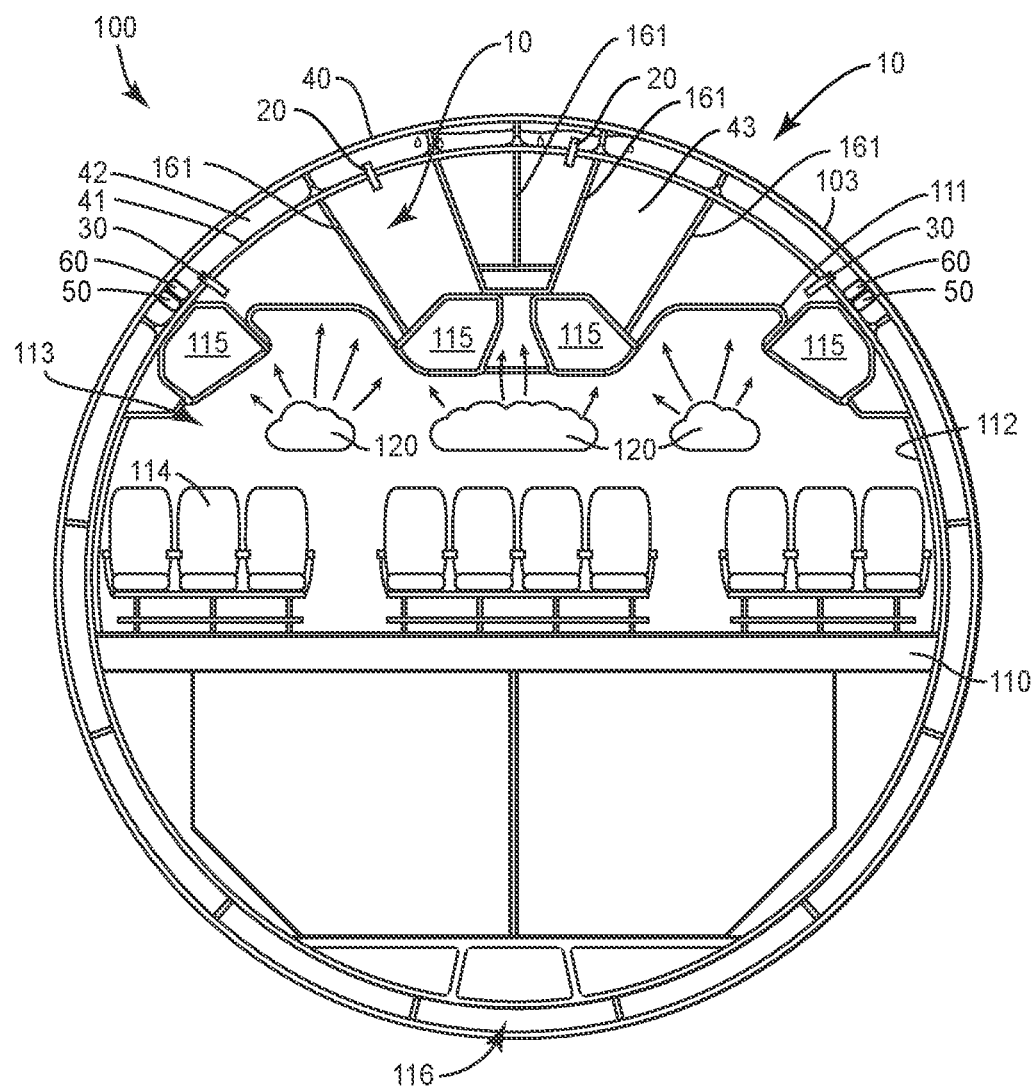
FIG. 2 is a section view cut along line II-II of FIG. 1.

FIG. 2 is a cross-sectional, schematic view of the aircraft 100 indicated by view arrows II-II in FIG. 1. FIG. 2 illustrates a simplified version of a portion of the aircraft fuselage 103 that includes an outer wall 40. The fuselage 103 also includes an insulation layer 41 positioned inward towards a center of the fuselage 103 from the outer wall 40. A gap 42 is formed between the outer wall 40 and the insulation layer 41. The fuselage 103 also includes a cabin 113 that includes a floor 110, ceiling 111, and aesthetic fascia walls 112. The cabin 113 can be equipped with seats 114 and luggage compartments 115 to accommodate passengers.

Respiration and other sources of water cause moisture 120 to be absorbed or form in the air in the cabin 113. For example, warm exhaled air includes moisture 120 that rises upward through the luggage compartments 115. Some of this warm and moist air rises through the ceiling 111 and into the crown space 43 of the cabin 113. Furthermore, some warm air continues to rise upward through the insulation layer 41 and into the gap 42 formed between the insulation layer 41 and the outer wall 40.

A ventilation system 10 is positioned to passively ventilate the air within the vehicle 100. The ventilation system 10 can be located above the cabin 113 to move the air within the crown space 43 and gap 42 between the insulating layer 41 and outer wall 40. The ventilation system 10 includes one or more inlet ducts 20 and one or more outlet ducts 30. The inlet and outlet ducts 20, 30 extend through openings 44 in the insulation layer 41 to move the air between the crown space 43 and the gap 42. The inlet ducts 20 can be positioned along the upper reaches of the crown space 43 so as to extend through the insulation layer 41 at the upper reaches of the crown space 43, and are configured to move air from the crown space 43 into the gap 42. The outlet ducts 30 are positioned vertically below the inlet ducts 20 so as to extend through the insulation layer 41 at a lower region of the crown space 43, and are configured to move the air from the gap 42 into the crown space 43.

The ventilation system 10 can include various numbers of inlet ducts 20 and outlet ducts 30. This can include a single inlet duct 20 and a corresponding single outlet duct 30. The ventilation system 10 can also include multiple inlet ducts 20 and outlet ducts 30. The inlet ducts 20 and outlet ducts 30 can be positioned in pairs or in uneven numbers. The inlet ducts 20 and outlet ducts 30 can extend along the length of the fuselage 103, or can extend along one or more limited sections. The inlet ducts 20 and outlet ducts 30 can be positioned along both starboard and port sides of the aircraft 100 or along just a single side.

The ventilation system 10 uses the buoyancy of air to create airflow between the crown space 43 and the gap 42. Warm air rises within the crown space 43. At this vertically elevated position, the air moves through the one or more inlet ducts 20 and into the gap 42. Once in the gap 42, the air in the gap may move along and/or flow against the outer wall 40, where the outer wall 40 experiences a decrease in temperature below the freezing temperature of water at an increased altitude of the vehicle, and cools the air in the gap 42. The cool air along the outer wall 40, becoming more dense than the air in the cabinet 113, then vertically sinks within the gap 42 to a lower vertical position. The cool air has a higher pressure and moves through the one or more outlet ducts 30 and back into the crown space 43 which has relatively warmer air at a lower air pressure. The amount of air flow within the ventilation system 10 depends upon the vertical height difference between the one or more inlet ducts 20 and one or more outlet ducts 30, and the temperature differential between the crown space 43 and the gap 42.

The movement of air along the gap 42 also provides for removing moisture from the air. As the outer wall 40 is cooled by the outside air at high altitude during flight, the temperature of the outer wall 40 eventually decreases to a temperature below the freezing temperature of water. This cooling causes the moisture 120 in the air to condense out of the air in the gap 42 and freeze as ice onto the outer wall 40. As the temperature increases when the aircraft 100 changes to a lower altitude and/or commences descent for landing, the ice begins to melt causing water droplets to form. Drains 60 located at the lower reaches of the gap 42 capture the water and direct it way, such as towards a bottom 116 of the fuselage 103. This prevents the moisture 120 from potentially moving along the support members 161 and into the cabin 113.

The ventilation system 10 uses buoyancy driven air flow to circulate through the crown space 43 and gap 42. The ventilation system 10 does not include air movement devices such as fans, air conditioning units, etc. to move the air. The one or more inlet ducts 20 and outlet ducts 30 are exposed within the crown space 43 and gap 42 and provide conduits for air flow.

As illustrated in FIG. 3, the gap 42 includes an air seal 50 vertically below the one or more outlet ducts 30. The air seal 50 acts as a block to direct the air through the one or more outlet ducts 30 and into the crown space 43. The air seal 50 can be positioned immediately below the one or more outlet ducts 30 to prevent the air that is moving downward in the gap 42 from moving vertically lower than and beyond the one or more outlet ducts 30. The air seal 50 can also be positioned farther below the one or more outlet ducts 30 to limit the amount of air that moves below the one or more outlet ducts 30. The air seal 50 can include a single sealing structure, or multiple separate structures positioned along the vehicle 100.

The drains 60 are positioned in the gap 42 to remove the moisture. The drains 60 can be located along the gap 42 vertically below the one or more outlet ducts 30. One design includes one or more of the drains 60 positioned in the gap 42 vertically between the one or more outlet ducts 30 and the air seal 50. This positioning provides for the drains 60 to capture the moisture that is in the gap 42 and that moves downward due to gravity. The drains 60 can be positioned at other vertical locations within the gap 42, including vertically equal to the one or more outlet ducts 30.

The one or more inlet ducts 20 are a conduit for air to move from the crown space 43 and into the gap 42. As illustrated in FIG. 4, the inlet ducts 20 include an elongated body 23 with a first inlet end 21 and a second outlet end 22. The body 23 is sized to extend through the insulation layer 41 with the inlet end 21 being exposed within the crown space 43 to receive the air and the outlet end 22 positioned in the gap 42. The inlet duct 20 includes a cross-sectional area that can include a variety of different shapes and sizes.

One or more of the inlet ducts 20 can be designed to prevent condensation from forming within the interior at a point where liquid can drip out into the crown space 43. In one design, the inlet ducts 20 are oriented for the inlet end 21 to be positioned vertically above the outlet end 22. Condensation that forms within the interior of the inlet ducts 20 is then directed into the gap 42 wherein the moisture can move along the gap 42 to the drains 60.

The one or more inlet ducts 20 can be constructed to reduce or eliminate the accumulation of condensation along a section or entirety of the interior. FIG. 5 includes an inlet duct 20 with an insulating layer 24 positioned on an interior side at the inlet end 21. The insulating layer 24 prevents or reduces the moisture-laden air that enters into the inlet end 21 from condensing along this interior section of the inlet duct 20. The insulation layer 24 is positioned along the section of the inlet duct 20 that is located in the gap 42. The moisture in the air tends to condense because this section is exposed to a lower temperature than the section of the inlet duct 20 in the crown space 43. The insulating layer 24 can be constructed from a variety of materials, including but not limited to adhered closed cell foam insulation, cold side enclosed fiberglass wool insulation, enclosed open cell foam, and composite insulation. In one design, the entire duct 20 is constructed from closed cell foam insulation and does not include a separate insulation layer 24.

The one or more outlet ducts 30 are a conduit for air to move from the gap 42 and into the crown space 43. FIG. 6 illustrates an outlet duct 30 that includes an elongated body 33 with a first inlet end 31 and a second outlet end 32. The body 33 is sized to extend through the insulation layer 41 with the inlet end 31 being exposed within the gap 42 and the outlet end 32 being exposed within the crown space 43. The outlet duct 30 can include a cross-sectional area that is smaller than that of the inlet duct 20.

Figure 7:
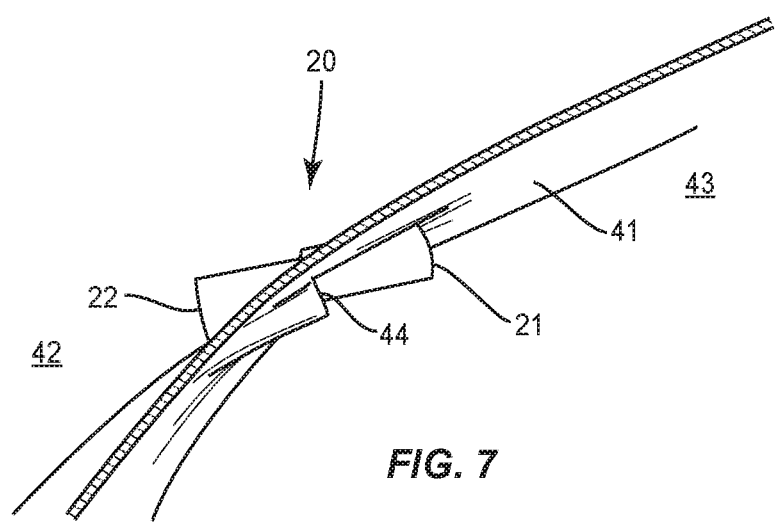
FIG. 7 is a section view of a duct extending through an insulating layer.

FIG. 7 illustrates an inlet duct 20 extending through the insulation layer 41. The inlet end 21 and adjacent section are positioned in the crown space 43 and the outlet end 22 and adjacent section are positioned in the gap 42. The inlet duct 20 can be angled for the inlet end 21 to be vertically higher than the outlet end 22. This orientation provides for any condensation to be directed into the gap 42 where it can eventually move into a drain 60.

Figure 8:
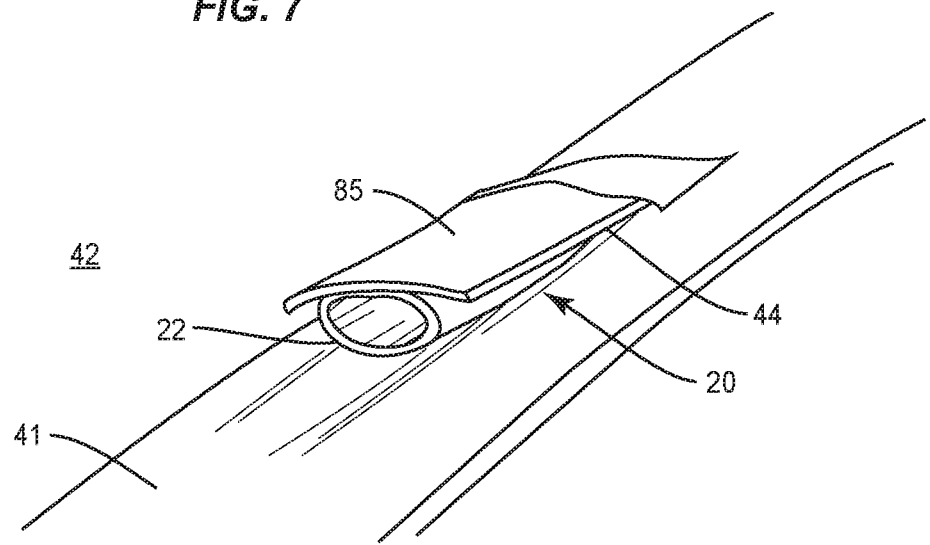
FIG. 8 is a perspective view of a duct extending into a gap.

As illustrated in FIG. 8, the inlet duct 20 extends through an opening 44 in the insulation layer 41. A flap 85 can be attached to the insulation layer 41 and extend over the inlet duct 20 that is positioned in the gap 42. The flap 85 is sealed to the insulation layer 41 vertically above the opening 44. The flap 85 can prevent uninsulated edges along the opening 44 to prevent condensation from leaking through the insulating layer 41 and into the crown space 43. The flap 85 can be constructed from an insulating material, and can have the same construction as the insulating layer 41. The flap 85 can also be used on the outlet duct 30 in a similar manner to reduce condensation from leaking into the crown space 43.

Figure 9:
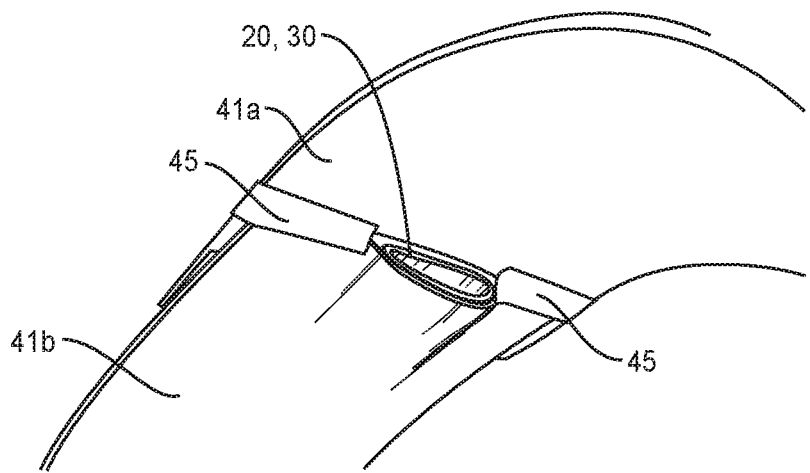
FIG. 9 is a perspective view of a duct extending through overlapping insulating layers.

The inlet duct 20 and outlet duct 30 extend through openings 44 in the insulating layer 41. The openings 44 can be cut into the insulating layer 41 and sized to accommodate the ducts 20, 30. In one design, the insulating layer 41 is solid, such as a molded foam. FIG. 9 illustrates the opening 44 created between two shingled, overlapping insulation layers 41a, 41b. The overlapping sections 45 of the insulating layers 41 are sealed to prevent condensation leak into the crown space 43.

Figure 10:
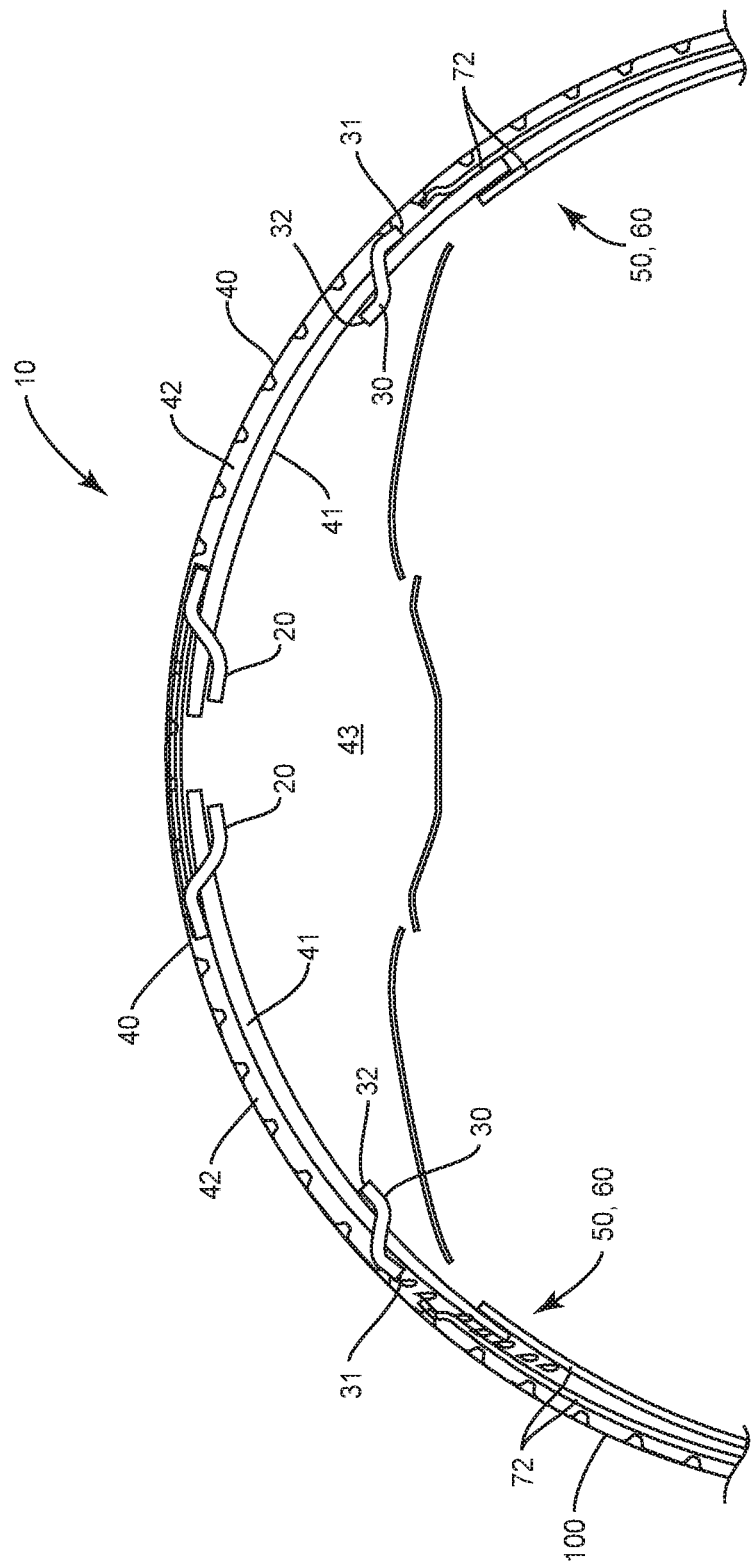
FIG. 10 is a side schematic view of a ventilation system with a drain and a seal.

FIG. 10 illustrates a ventilation system 10 with one or more inlet ducts 20 and outlet ducts 30 positioned along the port and starboard sides of the aircraft 100. The inlet ducts 20 are positioned along the upper reaches of the crown space 43 vertically above the outlet ducts 30. The different inlet ducts 20 can each be positioned at the same or different elevations within the crown space 43. The outlet ducts 30 are positioned along the lower reaches of the crown space 43 vertically below the inlet ducts 20. The different outlet ducts 30 can be positioned at the same or different elevations within the crown space 43. The inlet and outlet ducts 20, 30 each extend to the gap 42 formed between the outer wall 40 and the insulating layer 41.

The outlet ducts 30 can be positioned with the inlet end 31 facing downward in the gap 42. This positioning can prevent moisture that is in the gap 42 vertically above the outlet ducts 30 from moving vertically downward in the gap 42 and entering into the outlet ducts 30.

The seal 50 is formed between the insulating layer 41 and one or more additional insulation layers 72. FIG. 10 specifically includes the insulation layer 41 extending between two additional insulation layers 72. The insulation layers 41, 72 prevent air from flowing vertically below the seal 50.

The drains 60 are positioned vertically below the outlet ducts 30 to remove the moisture from the gap 42. The drains 60 can be formed between two or more of the insulation layers 41, 72.

The ventilation system 10 can be installed originally during the manufacturing process of the vehicle 100. The ventilation system 10 can also be installed in an existing vehicle 100.

Figure 11:
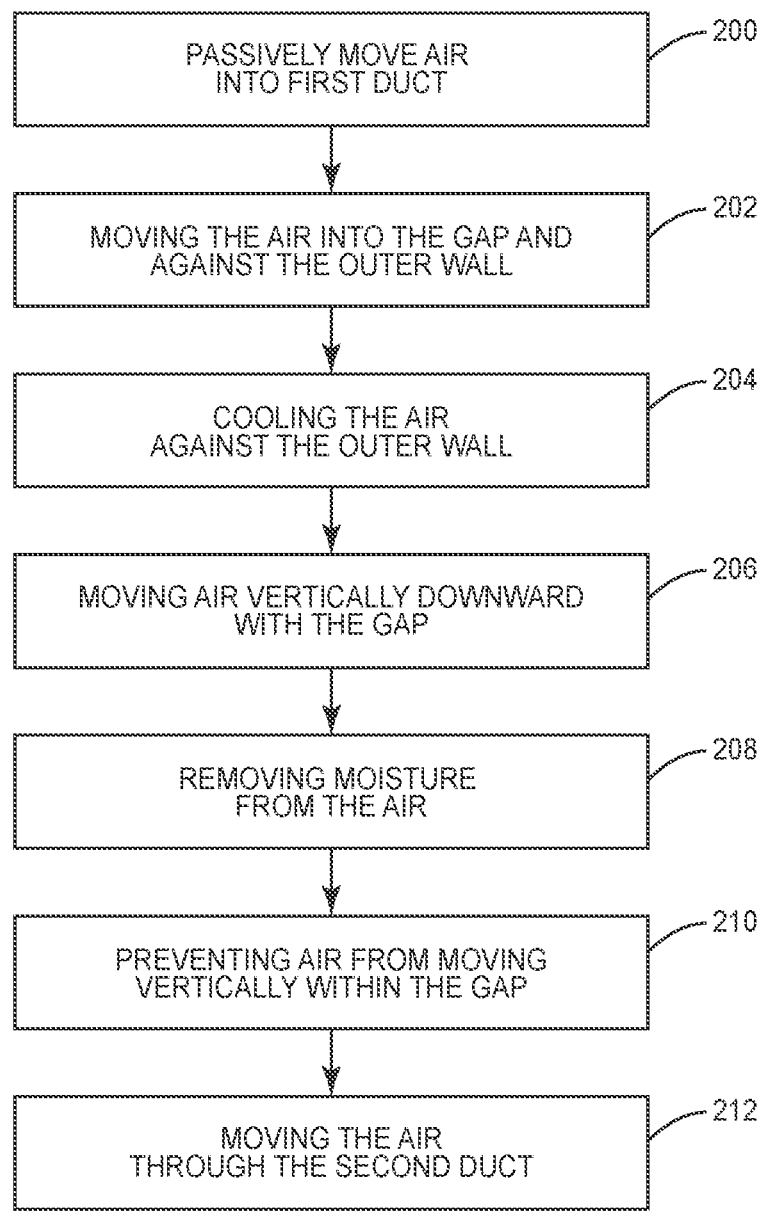
FIG. 11 is a flowchart diagram of a method of passively ventilating air within a vehicle

FIG. 11 illustrates a method of passively ventilating air within a vehicle 100 with a ventilation system 10. The method includes passively moving air from the cabin area 113 into the first duct 20 (block 200). The air is moved into the gap 42 and into contact with an outer wall 40 of the vehicle 100 (block 202). While the air is in the gap 42, the air is cooled as it contacts and flows against the outer wall 40 (block 204). The cooled air along the outer wall 40 moves vertically downward within the gap 42 towards the second duct 30 (block 206). As the air moves within the gap 42, the moisture in the air freezes against the outer wall 40 and is removed from the air (block 208). At the bottom of the gap 42, the air is prevented from moving vertically below the second duct 30 (block 210). The air is the gap 42 is passively moved through the second duct 30 and back into the cabin area 113 (block 212).

FIG. 11 is described with the air moving through an inlet duct 20 and an outlet duct 30. The ventilation system 10 can include various numbers of inlet ducts 20 and outlet ducts 30 with the air moving through each of the various inlet and outlet ducts 20, 30 to control the moisture in the air.

The inner wall can include a variety of constructions. One aspect includes the inner wall being the insulation layer 41. Other aspects include the inner wall being a fascia wall 112, structural wall, and wall of a luggage compartment wall 115.

The outer wall 40 can include the exterior wall of the vehicle 100. The outer wall 40 can also be spaced inward the exterior wall and positioned in proximity to exterior wall to change in temperature based on the altitude of the vehicle 100.

The device 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A system to passively remove moisture from air within a vehicle, the vehicle comprises an outer wall, an insulation layer that extends along the outer wall, a gap formed between the outer wall and the insulation layer, and a cabin area formed within the insulation layer at a center of the vehicle, the system comprising:
   a first duct that extends through the insulation layer, the first duct comprising an inlet positioned in the cabin area of the vehicle and an outlet positioned in the gap formed between the outer wall and the insulation layer;
   a second duct that extends through the insulation layer, the second duct comprising an inlet positioned in the gap and an outlet positioned in the cabin area;
   the first and second ducts comprising elongated shapes that extend through and outward beyond the insulation layer and into the cabin area;
   the second duct positioned in the vehicle vertically below the first duct; and
   the inlet and the outlet of each of the first and second ducts are not fluidly or physically attached to an air moving device;
   the first and second ducts positioned for enabling air within the vehicle to passively move through the first duct and into the gap, move downward through the gap where moisture in the air freezes against the outer wall, and move out of the second duct and back into cabin area.

2. The system of claim 1, wherein the first duct has a smaller minimum cross-sectional area than the second duct.

3. The system of claim 1, further comprising a seal positioned along the gap vertically below the second duct, the seal configured to prevent air from flowing along the gap vertically below the second duct.

4. A vehicle, comprising:
   an outer wall that experiences a decrease in temperature in response to an increase in altitude of the vehicle;
   an insulation layer positioned along the outer wall, the insulation layer comprising an outer side that faces towards the outer wall and an inner side;
   a gap positioned between outer wall and the insulation layer, the gap extending from a crown of the vehicle downward along a sidewall of the vehicle;
   a seal positioned at the gap to prevent airflow;
   a first duct that extends through the insulation layer, the first duct comprising an inlet positioned on the inner side of the insulation layer and an outlet positioned in the gap;
   a second duct that extends through the insulation layer, the second duct comprising an inlet positioned in the gap and an outlet positioned on the inner side of the insulation layer; and
   each of the inlet of the first duct and the outlet of the second duct being open and exposed on the inner side of the insulation layer;
   the second duct positioned vertically below the first duct and positioned vertically above the seal;
   the outer wall, when experiencing a decrease in temperature below the freezing temperature of water, causes moisture in the air within the gap to freeze against the outer wall when the air in the gap moves from the first duct to the second duct;
   the first duct comprises a smaller cross-sectional area than the second duct.

5. The vehicle of claim 4, wherein the outer wall is an exterior wall of the vehicle.

6. The vehicle of claim 4, further comprising a drain positioned vertically below the second duct, the drain configured to receive moisture that accumulates within the gap.

7. The vehicle of claim 4, wherein the inlet of the second duct faces vertically downward within the gap to prevent moisture within the gap from being captured in the second duct.

8. The vehicle of claim 4, wherein the first duct is positioned in proximity to the crown of the vehicle and the second duct is positioned along the sidewall of the vehicle.

9. A method of passively ventilating air within a vehicle, the method comprising:
- passively moving air from a cabin area into one or more first ducts that extends through an insulation layer and into a gap formed between the insulation layer and an outer wall of the vehicle;
- cooling the air within the gap that flows against the outer wall, where the outer wall is at a temperature below the freezing temperature of water and causes cooling of air flowing along the wall and moving the air vertically downward within the gap towards one or more second ducts that extend through the insulation layer and outward beyond the insulation layer and into the gap and outward beyond the insulation layer and into the cabin area;
- freezing moisture in the air in the gap that comes into contact with the outer wall;
- passively moving the air through one or more second ducts and back into the cabin area; and
- preventing the air from moving along the gap vertically below the one or more second ducts.

10. The method of claim 9, further comprising creating a difference in air pressure within the gap between outlets of the one or more first ducts and inlets of the one or more second ducts.

11. The method of claim 9, further comprising exposing the inlets of the one or more first ducts and the outlets of the one or more second ducts in the cabin area.

12. The method of claim 9, further comprising capturing moisture in the gap below the one or more second ducts and moving the moisture out of the gap.

13. The method of claim 9, further comprising sealing the gap below the one or more second ducts and preventing air in the gap from moving downward in the gap beyond the one or more second ducts.

14. The method of claim 9, further comprising positioning the one or more first ducts at a crown of the vehicle and positioning the one or more second ducts along a sidewall of the vehicle and above a floor of the cabin area.

15. The method of claim 9, further comprising decreasing a temperature of the air within the gap and increasing a density of the air as the air moves from the one or more first ducts towards the one or more second ducts.

16. The method of claim 9, further comprising increasing the temperature of the air within the cabin area after it exits from the one or more second ducts and decreasing a density of the air as the air moves from the one or more second ducts towards a crown of the vehicle.

17. The vehicle of claim 4, wherein the first and second ducts comprise elongated shapes that are wider than the insulation layer with each of the first and second ducts extending completely through the insulation layer.

18. The vehicle of claim 9, wherein the first ducts comprise an inlet positioned in the cabin area and an outlet positioned in the gap with the inlet positioned vertically above the outlet to direct moisture away from the cabin area.

19. The vehicle of claim 9, wherein the one or more second ducts comprise a smaller cross-sectional area than the one or more first ducts.

20. The vehicle of claim 9, wherein the first and second ducts comprise a curved shape.

* * * * *